United States Patent
Reich

(10) Patent No.: US 8,000,849 B2
(45) Date of Patent: Aug. 16, 2011

(54) METHOD AND APPARATUS FOR REMOTELY CONTROLLING AND STABILIZING UNMANNED AIRCRAFT

(76) Inventor: Stefan Reich, Murnau (DE)

( * ) Notice: Subject to any disclaimer, the term of this patent is extended or adjusted under 35 U.S.C. 154(b) by 491 days.

(21) Appl. No.: 12/084,019

(22) PCT Filed: Oct. 27, 2006

(86) PCT No.: PCT/EP2006/010370
§ 371 (c)(1),
(2), (4) Date: Feb. 12, 2009

(87) PCT Pub. No.: WO2007/048626
PCT Pub. Date: May 3, 2007

(65) Prior Publication Data
US 2009/0171516 A1    Jul. 2, 2009

(30) Foreign Application Priority Data
Oct. 27, 2005    (DE) .......................... 10 2005 051 799

(51) Int. Cl.
*G05D 1/08*    (2006.01)

(52) U.S. Cl. ................. 701/14; 701/10; 701/4

(58) Field of Classification Search ................ 701/3, 4, 701/10, 11, 14, 5; 244/75.1, 175, 181, 189, 244/194
See application file for complete search history.

(56) References Cited

U.S. PATENT DOCUMENTS
5,703,356 A * 12/1997 Bidiville et al. .............. 250/221
7,400,950 B2 * 7/2008 Reich ............................. 701/3

* cited by examiner

*Primary Examiner* — Richard M. Camby
(74) *Attorney, Agent, or Firm* — Fattibene and Fattiene LLC; Paul A. Fattibene

(57) ABSTRACT

An aid for remotely controlling unmanned aircraft and particular helicopters, which allow the pilot at least approximately to directly stir the angle of inclination, thus for instance a pitch(elevator) and/or roll angle, so that on neutralizing of the steering stick, the respective angle of attitude returns autonomously, and to a large extent goes back to the horizontal position. To this end, a closed-loop control of the inclination is carried out, in that an angular rate signal is being integrated to an actual value, and a nominal value is admixed behind the forming of the integral, wherein the time of integration is shortened in order to avoid null drifts, in particular by feeding a portion of the actual value and/or the nominal value back into the input of the integrator. Furthermore, a vectorial rotation of the integrated actual values by a yaw signal.

19 Claims, 3 Drawing Sheets

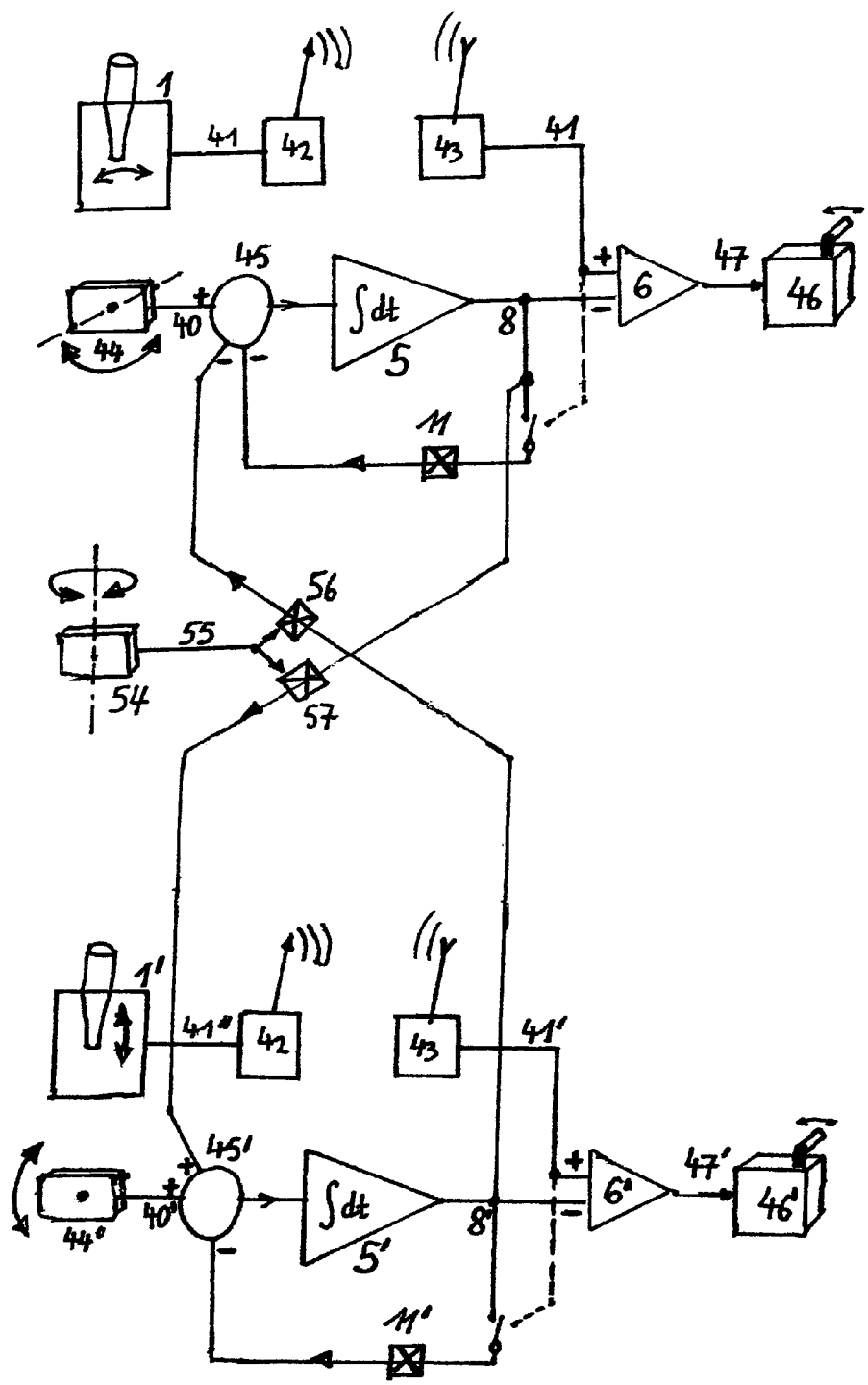

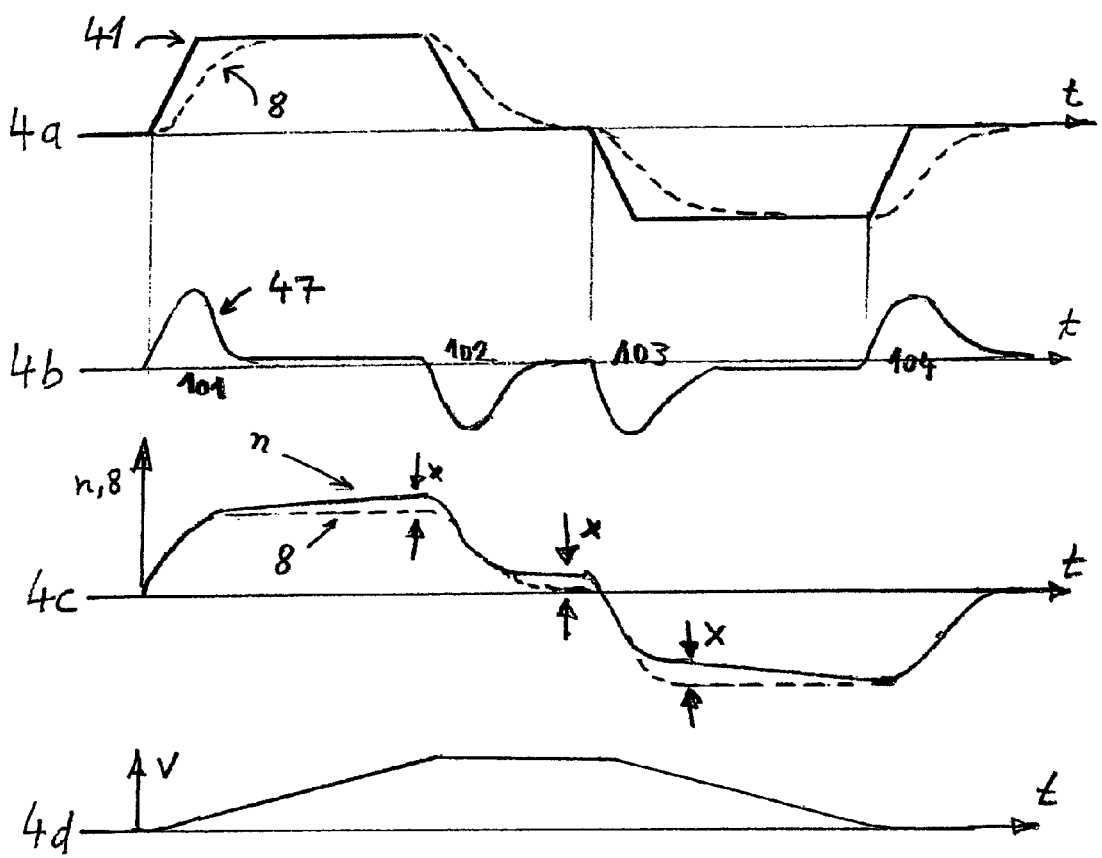

METHOD AND APPARATUS FOR REMOTELY CONTROLLING AND STABILIZING UNMANNED AIRCRAFT

Figure 1:
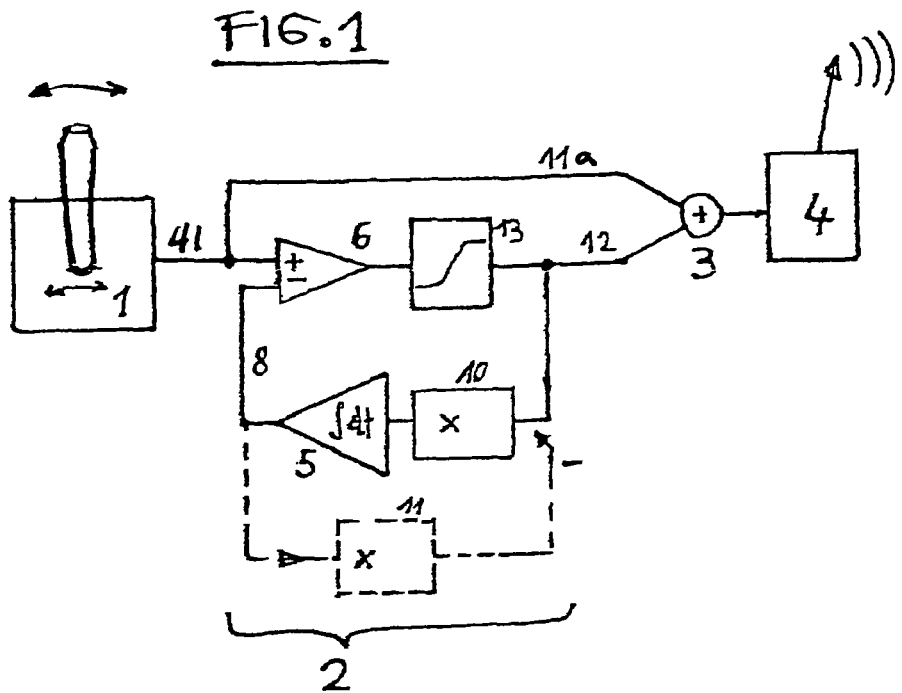

The invention relates to a method and an apparatus for providing an easier control of unmanned aircrafts and in particular for stabilizing said vehicles, and particularly for model helicopters controlled from the ground, or other rotary wing aircrafts, hovering drones and model airplanes.

For several reasons, the control of such aircraft is difficult and only possible for trained pilots. In particular it is necessary that any non neutral flight attitude, e.g. a roll attitude or a pitch (elevator) attitude, as occurring by control purposes or by coincidence will be reneutralized by the pilot, otherwise any remaining tilt would result in a flight trajectory with steadily increasing velocity. The reneutralizing is usually done by the pilot by continuous corrective steering. This however needs training and continuous visual check. Larger viewing distances additionally complicate the control. If for instance a helicopter is vertically above the pilot, stationary hovering is even impossible, since only stronger attitudes are visible. For solving this problem, attitude stabilisations are occasionally used, which however are either imprecise or mostly expensive, due to the measurement instruments.

DE 69502379.9-08, JP 10328427 and U.S. Pat. No. 5,738,300 describe auto pilot systems which, for manned helicopters, contain, amongst others, a gyroscopic measurement sensor and furthermore means for integrating signals.

Also, devices are known for attitude regulation by optical inclination measurement using the angle of incidence of light or infrared, which however are, adversely, dependent on an optical horizon.

Also, gyro stabilizers for movements at the vertical axis are known, which contain a gyroscopic rotational sensor. At this, an actual value/nominal value difference is generated between the measured value proportional to the turn rate and a nominal value from the pilot; and this difference is transferred to the respective actuator, via a control loop, for instance a PID control loop, which may contain an integrator. Using such stabilizers for attitude axis, i.e. the roll and/or pitch axis, may cause some stabilisation against mechanical and aerodynamic deviations, and therefore may allow replacing mechanic rotor head stabilisers; however it is not possible to automatically neutralize an existing attitude. Furthermore, the measurement signal's smallest drifts are inevitable being integrated along with it, adding up to errors which are corresponding to a faulty attitude.

Also, by the magazine "Rotor" 7/2002 a stabilizing system "VR-Stabi" is disclosed, in which electronic gyros are provided for the pitch axis and the roll axis, at which the paddle bar/stabi bar commonly used in model helicopters is electronically simulated. To this end, an integrated angular rate measurement signal is admixed to the output control point, for the pitch axis and the roll axis, wherein the pilot's steering signal is admixed directly as well as into the integrator's input. However, a reneutralization of an actual bank is not provided.

DE 103 04 209 A1 describes a trimming device which integrates steering signals, e.g. from a steering stick and from this generates a neutral trim value, thus making manual trimming to a neutral position unnecessary. However, the pilot still has to counteract any occurring inclined position; even after an intentionally initiated banking he would have to reneutralizing the bank with an accordingly dosed counter-deflection, since he can only control the alteration rates of the attitude (roll or pitch rate).

EP 0 752 634 describes an apparatus for closed-loop control of attitude of a remote controlled helicopter, at which an angular rate measurement signal is integrated within the scope of a PID branch, wherein the integral is presented as measurement value for the attitude.

DE 102 58 545 A1 describes a stabilisation system which contains the closed-loop control of a flight attitude and to this end suggests an integral with respect to time of a rotational signal which is proportional to the attitude's angular rate. For avoiding the nulling errors occurring from the integration, there is recommended (in particular see paragraph 0055) a combination with other attitude measured values from further instruments, which however means additional cost.

An object of the invention is to provide a method and an apparatus for unmanned remote controlled aircrafts, particularly rotary wing aircraft, which at least approximately allow a control of the attitude angle, i.e. for instance a pitch or roll angle, and which at least approximately restore the horizontal position on neutralizing the steering stick. In particular, it should be possible to generate a control value which is suitable for driving an actuator, as for example a servo motor.

To this end, the characterizing features of the independent claims are provided. Features of preferred embodiments of the invention are outlined in the dependent claims.

As an angular rate sensor, for instance a piezo-electric gyroscope or a SMS (silicone micro machine) gyroscope may be used.

The integrated measurement signal of the angular rate (rotation) sensor can be considered as the actual value of an attitude angle. Accordingly, an attitude regulation can be achieved which upon release of a steering deflection automatically drives the attitude back to approximate horizontal level.

According to the invention, a closed-loop control of the attitude can be carried out in that an angular rate signal is integrated to an actual value, wherein the integration time is narrowed, in order to avoid null drifts. For closed-loop control of the attitude, a nominal value is admixed behind the integral generation or subtracted hereof. The thus generated difference between the actual value and the nominal value (set point) can be transferred to the corresponding actuator via the known means of a control loop. As actual value/nominal value difference may serve: the difference between an attitude target value given by the pilot and an approximated actual value of the attitude calculated in the integrator. The invention makes it possible that with a remote controlled aircraft, after controlling and engaging of an angle of inclination and subsequent neutralizing of the steering stick, the horizontal position (attitude) is recovered to a large extent automatically.

The control system according to the present invention (may) in particular include that a control loop circuit is closed; said control loop may particularly be implemented as a PID. Unlike conventional PID (proportional-integral-differential) controls, the duration of the integration is narrowed down or shortened or confined, with respect to time. In particular, the shortening may be carried out by feeding back a portion of the actual value and/or the nominal value into the input.

While no signal is present on the input of the integrator, the shortening of the integration time may cause a retracting or 'discharging' of the integrator onto a zero value. The retraction may have an asymptotic time characteristic. By narrowing down the integration time it is avoided that null drifts sum up in an adverse manner to the integral value.

The time constant or the time window relevant for the narrowing may be defined; the definition may imply a predetermined time constant or a predetermined time window.

An advantage of the present invention is that errors resulting by drifts can be eliminated. Conventionally, by integrating a measured signal into an attitude signal, said measured signal being available only in increments, the null drifts of the measured signal automatically sum up to errors which correspond to a faulty attitude. Furthermore, with the integration in general, an un-defined constant of integration is generated. Both problems can be solved advantageously by the invention.

By the invention disadvantages of conventional inertial navigation systems or artificial horizons can be avoided, which are due to attitude sensors or three-axis-accelerometers needed for the pitch- and roll-axis. These additional sensors, which react on gravitation according to the principle of an air lever and whose measured values are required in state of the art systems in order to provide missing information about the absolute angle of attitude, said information missing in the integration of an angular rate signal, show several problems when applied in small helicopters: Due to the inherent acceleration in flight, the attitude can be measured only in a limited way by means of gravitation. Furthermore a measurement based on acceleration can be affected strongly by vibrations due to engine and mechanical unbalance, so that a sufficient precision is very difficult to achieve. Furthermore, by the invention cost advantages in production can be achieved.

The integration can be managed by a program controlled micro processor; the measured signal may be fed in via analog-digital-conversion.

The integration may be carried out by a consecutively repeated addition of a small portion of the signal to be integrated. In order to shorten the time window used in the integration according to a preferred embodiment of the present invention, one possibility is, for example, to feedback a small portion of the integrated result into the input of the integrator, in a negative feedback manner. This allows for the integrator to self discharge over a longer time span. This results in an asymptotic function of time. The factor of the feeding is the degree of feedback. It represents a relation between the non integrated and the time integrated signal and therefore has the physical dimension of a frequency and correlates to the reciprocal value of a time constant of discharging. An admixing with a small portion correlates to a large time constant. The integration may be carried out digitally, in particular micro processor controlled or in analog electronic way. An analog way of implementation is an RC-link connected as an integrator and having a time constant. In a digital embodiment, for example, a limit value of time for the integration could be stored in corresponding memories read-only or read-and-writable.

The term "shortening in time" does not necessary imply sharp time limits. The shortening in time causes that small measurement errors or null drifts of the gyroscope will not be integrated up endlessly, but will be limited in their effect; in the described case limited to an asymptotic boundary value.

The defined time constant may advantageously be chosen longer than the duration of usual steering deflections.

The shortened integration has the effect that the measured signal, available as angular rate signal, is transformed not into an exact but into a modified actual value of the attitude. The shortening of the integration time is not usual in conventional closed-loop controls, because thereby a full equalization fails, and a full-fledged control is not possible. In particular, in the first instance narrowing down the integration time seems adverse, even if a measured value of the attitude is derived from a measured value of an angular rate, because thereby longer lasting attitudes may no more be measured exactly but undervalued, i.e. wrongly.

With a closed-loop control of the attitude results hereby that a small off cut from a taken attitude remains when the steering signal at pilot's side is being withdrawn again.

In a case according to the invention the shortening of the integration time and the thereby caused deviation may be of advantage, however. The reason is that in flight, particularly during hovering of a helicopter, not only the conventional steering deflections which are proportional to a rate of an attitude, but also the deflections of attitude which therefore are the invention's signals: actual value and nominal value, have a usually short duration of time and result in almost zero in their mean value observed over a longer time. This can be explained by the fact that at a flight of a helicopter, during inclined attitude, almost no gravitational acceleration components are occurring transverse to the rotor shaft, because aerodynamic forces mainly appear in parallel to the rotor shaft. Longer lasting inclinations would result in a trajectory with continuously increasing velocity, as aforementioned, and are therefore not usual with hovering. Therefore the shortcoming caused by narrowing down the integration time is merely insignificant, if the narrowing of the integration time allows an integration time similar or longer than the duration of commonly used inclinations.

The residual attitudes remaining after the automatic retraction are only small and can be corrected very easily by the pilot. However, drifts caused by offset errors are effectively suppressed by narrowing down the integration duration, which facilitates an essential advantage.

In comparison with other conventional gyro stabilizers, the situation is different for the reason that the present solution admixes the steering signal as nominal value not before but after the integrator. From this results a response to the steering signal which is differentiated with respect to time, compared to the conventional gyro stabilizer.

As an advantage, no instruments other than the angular rate sensors need to be involved in order to achieve a feasible result. The invention may particularly work without any acceleration measuring instruments.

An especially good retraction control into the horizontal attitude has been found with the use of the invention in conjunction with model helicopters, which are equipped in the usual way with conventional mechanical stabilisation. To this end, such helicopters have a so called stabi bar or paddle bar which on its part works as a gyro.

A further possibility to shorten the integrator with respect to time is in feeding a small portion of the nominal value into the input of the integrator. Also this technique has the effect to shorten the time of integration in the sense of the present invention and to create a comparable behaviour. The similarity is based on that during flight the actual value, due to the control loop, is continually aligning itself towards the nominal value and therefore is similar to it. However has the above described feedback of the integral the advantage that the intended effect is achieved also without closed control loop, thus without flight and on ground.

A further possibility to generate the integral shortened with respect to time consists in that measured values are deposited consecutively in buffer memory cells, and current and possibly weighted mean values are generated from a defined number of stored values. This is equivalent to a convolution with a definable window function.

According to a preferred embodiment of the invention, the defined time constant is longer than the duration of usual steering deflections. This duration can be defined or predetermined adequately according to the application or the control device and/or the airborne object, respectively. The duration of usual steering deflections may for instance be defined by how long the aircraft needs, given a defined amplitude of steering deflection, to achieve a given angle of attitude; for example for achieving a 30° angle of inclination at the half of full travel of the steering stick, or a 45° angle of inclination at full travel. The duration of the time window may also be predetermined fix, for instance with a value between 2 and 12 seconds, in particular between 3 and 7 seconds, for example 5 seconds. With gyroscopes having a low drift, longer time constants are of advantage. In a further embodiment for defining the length of the time window, an operation mode may be provided in which the pilot performs a test flight with several settings, and he himself initiates the programming of a feasible length of time window into the control device, or a registration device evaluates a value for it.

Figure 2:
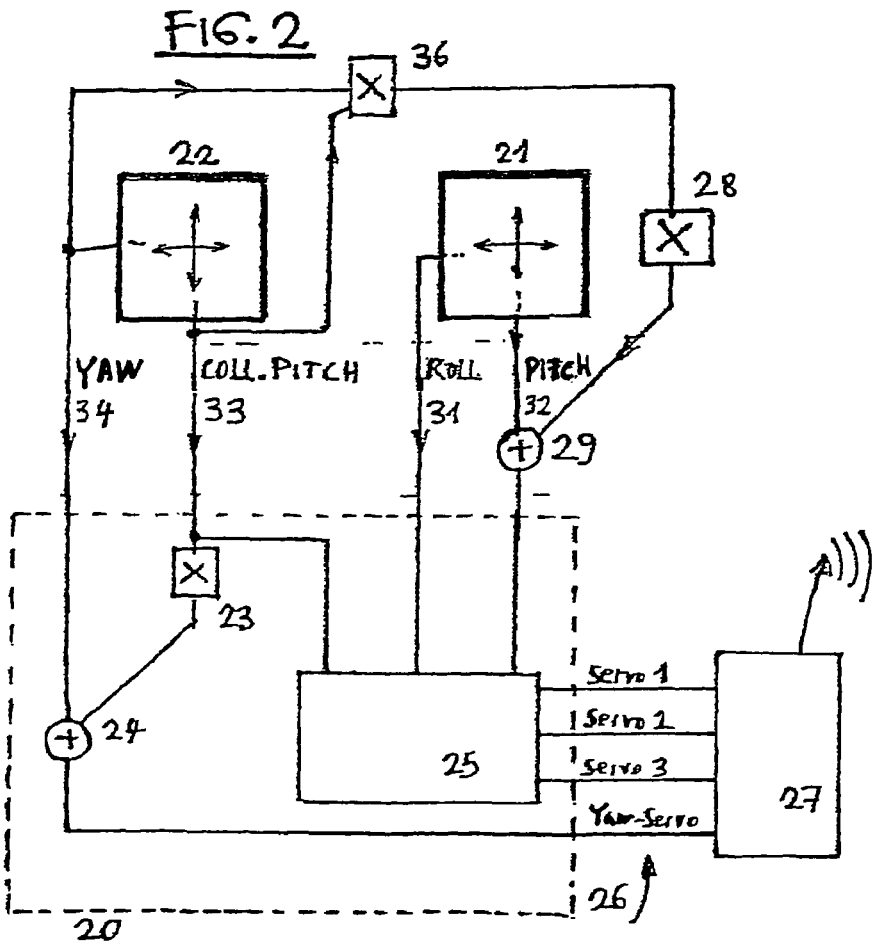

Below examples of embodiments of the invention will be described. There are showing:

FIG. 1: An apparatus for steering the inclination without an inclination-concerned sensor;

FIG. 2: A corresponding apparatus for several steering axis,

FIG. 3: An apparatus for closed-loop control of inclination with one sensor per steering axis and several versions of it, FIG. 4: Exemplary signal characteristics in the apparatus of FIG. 3. As far as equal reference objects appear in the figures, equal reference numerals are used.

FIG. 3 shows in the upper section a first example of embodiment as block diagram. A steering signal 41 generated via the steering stick 1 from the pilot is transmitted via transmitter 42 and receiver 42 into the stabilising apparatus, which contains the remaining depicted parts and is located on board of the remote-controlled helicopter. In the mixer 6, the signal 8 from the integrator 5 is, as an actual value, admixed negatively to the received steering signal 41, and the resulting actual/nominal difference 47 is fed as control value to the servo 46, which controls the roll movement of the helicopter. The received steering signal 41 acts as nominal value. The actual value 8 is generated in that on the one hand the measured roll rate signal 40 of the gyroscope 44 is integrated in the integrator 5 and on the other hand the integrated signal is being degeneratively coupled into the integrator 5 by a defined small factor 11 via the mixer 45, which shortens the integration time. Alternatively or additionally may, depicted by dashed lines, the steering signal 41 be utilized for admixing, in order to achieve, as described above, a similar (type on effective shortening of the integration, said shortening due to the steering action. An admixing of the steering signal 41 into the integrator is however not necessary. An admixing of the steering signal into the integrator may be carried out advantageously at a portion which is less than the portion of the fed-back integral 8. A mixing portion of the steering signal can here also be defined with the physical dimension of frequency or time. In the assessment of feasible mixing proportions, the sum of the portions fed from the integral value 8 and from the steering signal 41 is relevant for how fast the effective-time-shortening of the integral occurs. The values mentioned above for an advantageous time constant are then to be related to the sum of both the feedings.

An advantageous adjustment of the time constants may furthermore be undertaken in the way that without flight movement, for example with the aircraft held fix, after the nonrecurring giving and terminating of a steering deflection, the integral value 8, starting from a zero value, either remains unchanged or has a value of little influence on the control point 47 in comparison with the portion of the steering signal 41 in the control point.

Independently, further control technology devices may be provided, for example a PID mixing (not depicted) in the control point branch 47.

Furthermore, the integrated signal 8 may be limited in its amplitude by a limiter before it reaches into the mixer 6. Hereby can be achieved that one can over-drive the closed-loop regulation of the inclination by giving steering deflections greater than the amplitude limiting.

Furthermore, as an advantage there may be provided a second integrator behind the described integrator, whose input is charged with the first integral. The second integrator may thus be arranged cascaded. It can sum up continuing drifts which may possibly occur due to temperature drifts or other impreciseness of the angular rate sensor. The second integral value may be admixed in a degenerative feedback way into the first integrator, i.e. be subtracted from the measured signal of the angular rate; hereby it compensates the drift from the measured signal. The degree of admixing can be predetermined so small that a long time constant results, in comparison with the remaining sequences (developments). Useful are values of about 10 seconds or more.

One of the differences to the mentioned "VR-Stabi" known as state-of-the-art from ROTOR 7/2002, which simulates the behaviour of a mechanical stabiliser, is based on the following: In the signals occurring there, no actual or approximated measured value of inclination is found. Particularly the admixing of the steering signal into the integrator has the consequence that the integral and therefore the resulting flight attitude too continuously grow essentially during a steering deflection, which equals a conventional flight behaviour of a helicopter and also is intended with the calibration provided there.

FIG. 4 exemplary shows signal characteristics on a time axis t, concerning a steering axis, whereby a horizontal flight attitude in still-stand and without any outer perturbation is presumed.

Illustrated is a functional chain, starting from nominal value over control value and attitude to approximated measured-value for the attitude. All signals are exemplary and may as well occur diverse.

Graphic 4a shows a time characteristic of a steering signal 41 given by the pilot, as nominal value of an inclination. It exemplary consists of a first steering deflection, depicted positively, by means of which nominal inclination ought to be induced, then a neutral position, by means of which a re-straightening ought to be achieved, then a counter-deflection, by means of which a still-stand ought to be achieved by decelerating of the meanwhile achieved flight-velocity.

Furthermore, dashed depicted is the actual value 8 approximated from the integrator. The similarity of the actual value results in that the control loop is closed via the actuators 46; on occurrence of an actual/nominal-difference the flight attitude adapts itself accordingly so that the difference is being minimized again.

Graphic 4b shows a resulting control point signal 47 as difference between 41 and 8, which control point signal inclines the aircraft by the elevation in the area 101, subsequent straightens it up in the area 102, then counter-inclines it in the area 103 and again straightens it up in the area 104. The control value may further be limited. This graph also equates the steering movements which the pilot would have to perform without the use of the present invention.

Graphic 4c shows the real flight inclination, n, resulting from this; it marginally deviates from the original steering signal 4a: On the one hand it comprises slower edges according to the reaction time, on the other hand due to the discharging of the integrator it comprises a resulting aberration x which annihilates itself again after the counter deflection.

Furthermore, as in graphic 4a, the integrated signal 8 as the actual attitude value is depicted dashed. The effect of narrowing down the duration of integration becomes clear from the difference x between the graphs.

Graphic 4d shows the resulting flight velocity v. Disregarding outer influences, the flight velocity approximately equates a time integral of the flight inclination. Due to aerodynamic forces (resistance), however, this behaviour is best approximated in the way that the integral too is subject to a temporal shortening.

In this context, the advantage can be achieved that the temporal narrowing down of the integral 8 may easily be adjusted to the flight behaviour in the way that it approximately equates the integration time during the gathering of flight speed.

Hence results for the application, that by the control value, the pilot practically steers the acceleration of the helicopter, and that on deceleration to still-stand the error of the actual value of the inclination is automatically also being withdrawn, said error which has initially occurred due to the shortened integration time.

FIG. 3 shows in the lower section a second control system which equates the above one, so that the inclination is closed-loop controlled in both aboard coordinates.

As described above, the precise functioning if the invention is also based on the fact that the commonly used duration of occurring inclinations is small, due to the flight behaviour, and no continuing unidirectional inclination occurs. In FIG. 4d this becomes clear with the growing velocity when inclinations continue longer. This applies to inclinations measured in fixed space coordinates. Thus, the solution described so far is particularly appropriate for flights in which the aircraft does not essentially rotate about its own yaw axis, i.e. for example hovering flights of a helicopter. Otherwise the difficulty arises that the rotary axes, to which the measured values are related, namely pitch- and roll-axis, themselves are rotating, and thus even permanent inclinations may occur, namely in case they are related to the rotating aboard coordinates. For example, in a continually carried on curve, an inclination occurs although in ever-changing orientation, yet as an unchanged continued roll attitude. This would create an error during the forming of the approximated actual value of the inclination from the measured value of the angular rate, due to the shortening of the integration time according to the invention, so that the solution described so far would not be sufficient.

In a further embodiment of the invention is hence given a possibility for solving this problem. To this end, the signal processing described above and established for roll- as well as for pitch-axis, may be extended in that it is controlled in influencing way by a yaw signal signalising yaw rotations, for instance yaw rotations of the aisle, in such a way that on yaw rotation an according vectorial rotation is effected on the signals concerning the pitch and roll movements.

As yaw signal, the measured signal of a gyroscope as common in tail stabilizing may be used, or another signal which indicates a yaw rate or a yaw angle. Alternatively or in combination, a yaw steering signal may be used, for example from the respective steering stick. This signal too indicates with sufficient precision the yaw rate, particularly if the yaw rate is closed-loop controlled proportionally to the yaw steering signal by means of a past-connected gyro system. According to this, the yaw steering signal which is usually transmitted as nominal value to tail rotor stabilising devices may also be used.

The influencing may be carried out in the way that the integrated signals are being in particular vectorially rotated accordant to the rotation indicated by the rotation signal. The rotation may be carried out among the described yaw- and pitch-functions. To this end, the method known as rotary matrix, or the argument function known in the complex algebra may be engaged. In particular, the roll control may for instance be assigned to an x axis or to a real numeric axis, and the pitch (elevator) control to a y axis or to an imaginary numeric axis, and the rotation may be carried out herein. The rotation can be calculated in the number field numerically. This can for example be carried out in program-controlled incremental steps, on the memory contents of the integrators 5 provided for rolling and pitching.

The combination according to the invention with the vectorial rotation has, firstly, the advantage that actual-values of inclination which are present in the integrators are being rotated along with yaw movements, if the actual-values have evolved from correct measurement, and a measurement error is avoided which otherwise would occur. A helicopter having for instance an actual inclination towards the front, will, after a 90° left turn, be inclined to the left or after a 180° turn, be inclined towards the rear, without yaw or roll movements having occurred. This can be right corrected by the method.

Secondly, the vectorial rotation facilitates that even permanent bankings during curves become approximated with sufficient accuracy, despite of the narrowing down the integration time according to the invention, because the integral values are continually rotating and thus not become cancelled by narrowing down the integration time, due to their permanent changes.

FIG. 3 shows in the middle section the vectorial rotation. The measured value 55 originating from the yaw rate sensor 54 is proportional to the yaw rate. The actual value of roll from the (upper) integrator is being multiplied by multiplier 57 with the yaw rate and mixed into the pitch integrator 5' as an incremental rotation change. Vice versa, the actual value of pitch 8' is being mixed negatively into the roll integrator 8, so that both by both mixings in total results an incremental vector rotation amongst the pitch and roll signals. Another possibility is to mix in a rotary way, using a rotary matrix, the measured values 40, 40' of the inclination rates amongst each other, or the output signals or other internal signals.

Another possibility to implement the integrator, particularly in order to integrate the measured-values of inclination-rates and optionally also to integrate the described degenerative admixing of the actual-value and/or nominal-value, is to employ a vectorial rotation, as it has been described here for the yaw axis. At this, a vector bipod or trihedral can be defined. In addition, this may include an upward directed vertical vector which is also subject to the rotation.

The present invention may be implemented also by calculation of a generally rotatable vector trihedral.

In particular, the described integration which has an input and an output, can be achieved in that in general a vector trihedral is arithmetically rotated according to an angular rate given as an input signal. The rotation may be carried out in that, in a cyclically repeated calculation, the trihedral is being turned further incrementally in a small angle, wherein the small angle is defined by the input value of the angular rate. To this end, the measured-value of the angular rate sensor may be utilized. The resulting deflection of the vector trihedral may be utilized as output signal. The process represents an integration. The output signal may be at small angles approximately linear; it may equate to a deflection of the trihedral. To this end may for instance be calculated or utilized a turn angle or, more simply, directly one of the vector coordinates. A deflection defined this way is considered as integral likewise, in the sense of this invention, and is usable thereunto. Thus the narrowing down of the integration time may be carried out in that a calculative value denoting the deflection of the vector trihedral is being admixed negatively into the angular rate input value which defines the turn rate.

Such embodiments facilitate that after loops with inverted position and return to normal flight attitude, the calculated integrals are turned back correctly.

In a further embodiment feasible for stabilizing inverted flight, the admixing of the integral 8 into the control point can be carried out with reverse polarity, i.e. with inverse sense of direction or sign. By this, a control loop created by the actual-value/nominal-value-comparison is stable in inverted position. The sense reversal can be performed subject to the sign of a vertical component of a vertical vector rotated accordant to the flight attitude. By this, it can be achieved that the reversal occurs automatically when the flight attitude changes into reverse, thus enables stable closed-loop control in both orientations without commutation. The sense reversal may be achieved by multiplying the integral which is subject to reversal with the value of the vertical component.

Since programmable radio transmitters according to the state of the art are usually containing a program controlled micro processor as a component anyway, the present invention can be retrofitted, at least in part, into an already existing hardware by a software which controls the accomplishment of the described methods.

The apparatus may be provided aboard the aircraft. The apparatus may be structurally unified with an aboard mixer or with a remote control receiver. The described mixings can consist of an addition or of any other kind of superposition.

Now, the examples of embodiments according to FIGS. 1 and 2 are described. These examples specify aspects of the invention which also may be applied independently of the above-described aspects of the invention.

These too enable the pilot to control the angle of attitude, at least approximately, i.e. for example a pitch- and or roll-angle, so that at neutralising of the steering stick, the respective angle of inclination returns back to horizontal position autonomously and to a large extent.

Conventionally any non-neutral attitude as occurring for steering, for example a roll- or pitch-attitude, has to be steered back actively by a well dosed counter deflection on the input unit. The counter deflection has to be carried out in such way that the product of duration and elevation is accordant to the original deflection. Therewith a steered attitude is being retracted and a neutral flight attitude recovered. Usually this is carried out by the pilot, whereby a control loop results.

As an aid for remote controlling of unmanned aircraft and in particular of helicopters, a steering signal given by the pilot is high pass filtered.

For the input of steering signals, input units may serve, for example steering sticks or any other input means which operate continuously or quasi-continuously. The steering signals may, for example via radio, be transmitted from ground to the aircraft.

At least one steering signal is subject to a high pass filtering, and the high-pass-filtered signal is being fed to the control point or at least in part admixed to the control point. This mixture may be forwarded directly to the respective actuating element. Thus, in place of the conventional manual steering signal, a high-pass-filtered signal derived from this manual steering signal may be utilized. The high pass filtering can also be described as differentiation with respect to time. Thus, the actuating element will, on the basis of the steering action given by the pilot, perform a movement which equates the differential function of the given steering movement or contains this at least in a portion.

By this method, the following is achieved: A flight situation which has been achieved by a given deflection at the steering stick, for instance a banking or flight inclination, will at least in part be retracted, in that by the high pass a contrariwise steering deflection is being generated, namely at the moment when a given steering stick deflection is withdrawn again, for instance when the pilot releases the stick. Instead of stick, any other type of input may be utilised.

The control is essentially simplified, since the counter-deflection described above is not needed to be carried out manually but is generated automatically by the high pass function. Thus the pilot can comfortably steer the flight attitude. Advantage is that this is possible even without the need of an aboard instrumentation measuring and controlling the inclination. The retraction of an inclination is performed more precise than would be possible in conventional way particularly with poor line of sight.

The retraction can be carried out entirely; to this end one would entirely differentiate the steering signal, i.e. use a high pass filter without passage for the original input signal. In most cases however it is better to keep the original steering signal at a reduced portion. To this end, an un-filtered portion of the steering signal may be admixed. This facilitates, that drifts may further on be equalized by trimming, and that a neutralizing out of any flight attitude is possible by the pilot.

Another application results for flying objects which have a "can kered" steering behaviour which disturbs in the way that a steered execution will get enhanced even after termination of the steering deflection. This overshooting too is efficiently suppressed by the present aspect of the invention.

This embodiment does not need to be restricted on attitude control. It may in general be utilized for making inertially reacting steering functions faster and easier to control. Advantages of easier handling are resulting with any control which reacts delayed. With the helicopter, this includes the vertical control, for instance via collective-pitch control or via revolution speed if it is varying for vertical control purpose. Advantages also result for aeroplanes, ships and other vehicles.

The high pass may be implemented by an electric RC link or other electronic circuitry feasible therefor. Also, the high pass may be implemented arithmetically, for instance digitally and program controlled, at which for example a micro controller may control the program. A digitally constructed high pass can equate or resemble the function of a RC link. The function of such high pass can be demonstrated with the one of a RC link. According to the invention there is however no restriction about the implementation of the high pass.

The characteristic of the high pass may also be defined in that from the signal a portion of higher frequency is transferred with larger amplitude than a portion of lower frequency, or that signal alterations are being amplified comparatively to static signal portions, or that static signal components are being taken out or controlled down or diminished, or that a time differential is formed, or that a ahead-hurrying phase shift is occurring or being generated. The high pass may be formed in that the signal is being delayed by a defined time and subtracted from the current signal. Likewise, such convolution functions generally may be used which show a high pass characteristic. Also, the high pass may be implemented in that an integrator, which is subject to degenerative feedback, or a low pass, is provided, and the output of which is subtracted from the original steering signal.

The apparatus for differentiating of high pass filtering may be provided aboard the aircraft; as well it may be structurally unified with a transmitter device.

With control circuits it is common to use a differentiating element upon measured signals or on actual-value/nominal-value differences (conventional PID control loop). In the present aspect of the invention however there is no measured signal necessary. A steering signal which is exclusively given by the pilot can be differentiated of high pass filtered. It is sufficient if no signals originating from measurement instruments are being differentiated or high pass filtered.

FIG. 1 shows a block diagram of a preferred apparatus. The pickup signal coming from the steering stick (1) is subtracted in the subtraction element (6) from an integrated signal (8). The difference is forwarded to the transmitter unit (4) via the mixer (3). Also, the difference is multiplied with a defined factor (10) and fed into the integrator (5). Thus the integrator (5) is subject to a feedback via the circuit formed by (8), (6) and (10).

This apparatus may be provided in multiple in the same way for several steering functions, for example for pitch, roll and climb function of a helicopter.

The signal generated at the output of the integrator (5) is slowly following the steering signal (41) from (1), and may be interpreted as simulation of the expected flight attitude, e.g., at an implementation for control of inclination, as an approximated angle of inclination, since also the airborne object has the same integrating behaviour. Therefore, the degenerative feedback of the integrator acts as a simulated closed-loop control on the angle of inclination, said angle being simulated in integrator (5).

The high pass filtered signal may be amplified before it is fed to the actuating element and may create accordingly strong deflections. In order to prevent an abutting of the linkage, signal limiter (13) is provided. In that the integrator (5) is arranged in such way that it too receives the already limited signal, it is achieved that even with the limiter acting, no difference occurs between the calculated integral and the factually achieved flight situation or flight attitude. Errors due to non linear or narrowed actuator linkage are therefore prevented.

It is of advantage to also admix, additionally to the high pass filtered signal 12, a portion 11a of the un-treated steering signal, by mixer 3. This facilitates that static drifts, remaining undefined constants of integration or outer influences can be compensated as well by the steering signal given by the pilot.

The admixing may also be carried out in that the integrator 5 is being fed back in degenerative way, with factor 11, via the dashed depicted second feedback branch.

Optionally a possibility may be provided for adjusting the time constant of the high pass, i.e. an upper critical frequency. In FIG. 1 the factor 10 can be adjusted to this end, preferably via an input device. In general, the upper transit frequency of the high pass may be varied or chosen at will, in order to optimise the steering behaviour. Values between 0.15 and 0.5 seconds have especially shown to be of advantage. Faster time constants are of advantage for faster steering compliance, too fast time constants cause an unnecessary amplification of short and tremulous movements.

If the high pass is denoted as a differentiating element, then this definable time constant equates a finite time dt of differentiation, or an additional low pass which, in conjunction with an ideal differentiating element, is forming the real differentiating element. In the resulting transfer function, this correlates to an upper critical frequency.

The un-filtered signal portion 11a may, in a weaker portion than commonly used in the state of the art, be admixed. The advantage is a less critical, less delicate adjustment of the trim levers. Alternatively, the un-filtered portion can keep the original level, wherein the admixed high-pass-filtered signal portion may for example be used for additional increasing of the steering compliance.

By the admixing of an original signal portion, a second time constant is formed, which may be defined as, or results from the mixing proportion between differential and proportional part. This time constant equates a lower critical frequency between the constant and the rising frequency curve in the resulting transfer function.

For steering the climb function with helicopters of different weight, the described time constants may be adjusted to the inertness determined by the weight and other factors in such way that the climb rate responds to the stick position practically un-delayed, directly proportionate.

Furthermore, portions of the un-filtered and/or un-treated steering signal may be altered in a non linear way, for instance in dependence of the given steering deflection.

To this end, a threshold or a limit may be provided, above which or below which a portion of the signal is amplified or suppressed, or another non-linear element. This allows optimisation of the behaviour depending on the pilot's wish and the application.

A particularity with this is that no aboard instruments are necessary. The apparatus for differentiating or high pass filtering may therefore be structurally unified with a transmitter device and requires no apparatus aboard.

A further difficulty when controlling a helicopter is the gyroscopic effect of the rotor in conjunction with the three-dimensionally linked sense of direction. A helicopter which for instance has an attitude towards forward will, after a 90° left turn, be inclined towards the left, or, after a 180° turn, inclined towards the rear. Therefore, manual straightening requires particularly accounting for the yaw movements.

A further objective of the invention in a further embodiment is therefore the possibility to automatic re-straightening, independent of yaw movements. To this end, the signal processing describes above may be extended in that it is controlled, in influencing way, by a yaw signal which indicates yaw movements, for instance yaw rotations of the aisle. This facilitates during rotations an adequate correction of the generated retraction signals.

As yaw signal, the measured-signal of a gyroscope as common in tail stabilizing may be used, or another signal which indicates a yaw rate or a yaw angle. Alternatively or in combination, a yaw steering signal may be used, for example from the respective steering stick. This signal too indicates with sufficient precision the yaw rate, particularly if the yaw rate is closed-loop controlled proportionally to the yaw steering signal by means of a past-connected gyro system. As an advantage, the indicated rotation needs to be only approximately precise. Also may be used the yaw steering signal which is usually transmitted as nominal value to tail rotor stabilising devices. The apparatus according to this aspect of the invention does not need to be aboard but may be located on ground.

The influencing is carried out in the way that the integrated signals and/or the generated high pass portions are being rotated accordant to the rotation indicated by the rotation signal. The rotation may be carried out among described yaw- and pitch-functions. To this end, the method known as rotary matrix, or the argument function known in the complex algebra may be engaged. The roll control may for example be assigned to an x axis or to a real numeric axis, and the pitch control to a y axis or to an imaginary numeric axis, and the rotation can be carried out herein. Advantageously, as rotation signal may be utilized a signal which is proportional to the angle rate, and the rotation may be carried out in program controlled incremental steps on the memory contents of the integrators (5) provided for roll and pitch. A further difficulty with controlling a helicopter is the fact that the sideward thrust exerted by the tail rotor in regular way would bring the whole helicopter into a translatory motion, which however is in regular way obstructed in that the helicopter has to engage in a counter-oriented roll attitude during hovering flight. After a yaw movement, this roll attitude disturbs in the above mentioned way. After a turn of, for instance, 180°, the thrust of the tail rotor and the now reversed roll attitude do not any more counteract but co-act and let the helicopter drift off laterally, if the pilot does not counteract this early enough. This problem is particularly obvious with light miniature helicopters due to the large angle of attack of their rotor blades.

According to a further aspect of the invention, or, respectively, in a further embodiment, which can be independent of the already disclosed aspects, it is a further objective of the invention, with it, the possibility to facilitate, while yaw movements present, an automatic compensation of the neutral roll attitude. To this end, a signal mixing is provided, which adds, i.e. admixes, a rotation signal signalising yaw axis rotations, to a steering signal which controls the pitch (elevator) movement. As result, the helicopter receives a steering signal which is proportional to the yaw rate, said steering signal oriented forward or rearward accordant to the yaw direction (right or left). Since the roll- as well as the pitch-movement follow the steering signals in an incremental way, the effect of the generated pitch signal does, during a rotation, not ever sum up to a pitch attitude, but rather in 90° offset in phase and angle, thus in the desired direction of correction of roll, which compensates the influences of the tail rotor.

As yaw signal may, just as described above, be utilized the measured-signal of a gyroscope usual with tail stabilizing, or another signal which indicates a yaw rate or a yaw angle. Alternatively or in combination, a yaw steering signal may be utilised, for instance from the respective steering stick. For example, the nominal value provided for feeding to a tail rotor stabilising device, may be used as rotation signal. This signal too indicates the yaw rate with sufficient accuracy. Thus the apparatus may again be located on ground.

Remote control transmitters are usually already equipped with mixing devices which for instance mix the steering signals for collective-pitch, pitch(elevator) and roll in such a way that swash plate servos can be driven, or allow a compensating mixing from collective-pitch to tail rotor or from throttle to tail rotor; therefore the extension related to this embodiment can already be achieved by additionally creating a further mixing possibility from the yaw steering signal to the pitch (elevator) steering signal. The mixing proportion may be adjustable by the user.

FIG. 2 shows a block diagram of an embodiment of the invention, in which a mixing 29 is provided, by which a rotation signal 30 is admixed in a defined proportion into a pitch (elevator) steering signal. Each of the steering sticks 21 and 22 contain two pickup units for manual generation of steering signals roll 31, pitch (elevator) 32, collective-pitch 33 and yaw 34. Optionally may here be inserted the high pass filtering depicted in FIG. 1 (not depicted in FIG. 2).

The mixer apparatus 20 contains a mixer matrix 25 as known from the state of the art, for mixing the servo signals (26, Servo1, Servo2, Servo3) provided for the swash plate, from the steering signals roll, pitch (elevator) and collective-pitch; and furthermore a mixing (24) for admixing of a portion of the collective-pitch signal 33 to the yaw signal 34, wherein the portion is definable in the calibrator 23. The mixed signals are together being transmitted, in the radio transmitting unit 27.

According to the invention, the additional mixer 29 is provided in this embodiment, said mixer which admixes a portion of a rotation signal 34 to the pitch (elevator) steering signal 32. For the sake of convenience, in this example, the yaw steering signal is used as rotation signal. Furthermore is provided a multiplier 28, which allows to variably define the mixing proportion, e.g. according to an adjustment. Here, the steering signal 32 steering the pitch (elevator) movement comes directly from the pickup unit which is actuated by the pilot.

Since the thrust of the tail rotor depends on the current attack angle of the main rotor blades, it would be desirable if the intensity of the invention-specific compensation would adapt itself. To this end, a multiplier 36 is provided which receives a collective-pitch steering signal and multiplies by it the rotation signal which is subject to go to the compensation. It is of advantage if the zero point of the collective-pitch signal is approximately matching with the zero point of the generated lift, because in both directions of lift the tail rotor thrust, which is to be compensated, increases, each with opposite sense of compensation.

The mixing apparatus can be provided aboard and be connected to the outputs of a remote control receiver, so that it works on the received signals.

This apparatus and the respective method may, with advantage, also be implemented independently from the high pass filtering described above.

In a preferred embodiment, several of the embodiments describes here can be combined with each other; however an embodiment may also be implemented independently.

The elements depicted as blocks in FIG. 1 or 2 can be provided as respective hardware components; they may as well be implemented as program controlled steps of calculation in a micro processor. The micro processor can be built into the transmitter device. The same micro processor may be used which is also used for the controlling of the conventional functions.

The high pass filtering can as well be carried out on mixed signals, as commonly used for instance for driving a swash plate.

The apparatus may also be structurally combined with stabilizing devices which contain measuring instruments. The described apparatus can advantageously be combined with measurement and control systems, in particular with such for flight stabilising.

With this, at least one option or mode-of-operation can be provided which engages no respective measured-signals for at least one steering axis.

In particular, the invention is feasible to be implemented as computer program (software). With this, it may be distributed as computer software module, as a file on a data carrier like a disk or CD-ROM or as a file via a data- or communication network. Such and comparable computer software products or elements of computer software are embodiments of the invention. The process according to the invention can find application in micro processor controlled appliances, particularly in remote controllers. With this, it is obvious that respective computers and appliances on which the invention is applied, may contain further technical arrangements already known as themselves, like: input devices (e.g. keyboard, mouse, touch screen, control panel with steering stick), a micro processor, a data- or if applicable control bus, a display device if applicable (monitor, display) and a working memory, a hard disk memory if applicable, and communication equipment (e.g. radio transmission devices).

The above mentioned various aspects of the invention as well as versions and sub-versions may arbitrarily be combined with each other.

The invention claimed is:

1. A method for controlling an unmanned remote controlled airborne object capable of hovering comprising the steps of:
generating a steering signal formed by a pilot using a pickup unit and wherein for achieving at least in part an automatic restoring of the horizontal attitude of the airborne object when the pickup unit is neutralized;
generating at least one rotation signal of an angular rate of at least one of an inclination pitch (elevator) and roll is formed, the at least one rotation signal is integrated with respect to time using an integrator, and the integral is being drawn upon, within the scope of a closed-loop-control, as an actual value of an angle of inclination, and a steering signal is being drawn upon as a nominal value of an inclination angle, and the difference between the actual value and the nominal value is transferred to an actuator unit controlling the flight attitude, and
wherein the duration of the integration time is narrowed down accordant to a defined time constant or accordant to a defined time window.

2. A method for controlling an unmanned remote controlled airborne object capable of hovering according to claim 1, wherein:
the measured signal of an angular rate sensor for at least one of the inclination axes roll and pitch (elevator) is used as a rotation signal.

3. A method for controlling an unmanned remote controlled airborne object capable of hovering according to claim 2, wherein:
at least in one mode of operation, no further attitude measuring instruments are used.

4. A method for controlling an unmanned remote controlled airborne object capable of hovering according to claim 1, wherein:
the narrowed-down time of integration is implemented by mixing a defined small portion of at least one of the values actual value and nominal value in opposite sense into the input of the integrator, so that the integral can discharge over a longer time duration.

5. A method for controlling an unmanned remote controlled airborne object capable of hovering according to claim 1, wherein:
the integration with narrowed-down integration time is implemented by consecutively storing measured values in buffer memory cells and by consecutively forming a mean value from a defined number of stored and in particular weighed values.

6. A method for controlling an unmanned remote controlled airborne object capable of hovering according to claim 1, wherein:
the narrowed-down integration time is longer than the duration of common attitude deflections.

7. A method for controlling an unmanned remote controlled airborne object capable of hovering according to claim 1, wherein:
an adjustment of the defined time constant is adapted so that with the airborne object held fix, after a nonrecurring giving and terminating of a steering deflection of common duration, an integral value, starting from a zero value, has a value of little influence on a control point in comparison with a portion of the steering signal in the control point.

8. A method for controlling an unmanned remote controlled airborne object capable of hovering according to claim 1, wherein:
by means of a yaw rotation signal signalizing at least approximately the yaw rotations of the airborne object, the signals are, as arithmetic values, subject to a vectorial rotation, wherein the angle of rotation is controlled by the rotation signal.

9. A method for controlling an unmanned remote controlled airborne object capable of hovering according to claim 1, wherein:
the integration of the angular rate signal of the inclination is carried out in that a vectorial coordinate system is continually rotated arithmetically in an incremental way with an angular rate of an inclination.

10. A method for controlling an unmanned remote controlled airborne object capable of hovering according to claim 1, wherein:
a difference between the steering signal and the integrated signal is subject to the integration, thus the steering signal given by the pilot is subject to a high-pass-filtering, and
wherein the high pass filtering contains no measured-signal originating from measuring instruments, the high-pass-filtered signal is forwarded or at least in part admixed to the control signal provided for driving actuators.

11. A method for controlling an unmanned remote controlled airborne object capable of hovering according to claim 1, further comprising the step of:
performing the steps with a computer software product containing a program code loaded on a micro processor.

12. A method for controlling an unmanned remote controlled airborne object capable of hovering according to claim 11 wherein:
an essential part of the program code allows being embedded into an existing flight stabilizing device.

13. A method for controlling an unmanned remote controlled airborne object capable of hovering according to claim 11 wherein:
an essential part of the program code allows being embedded into a programmable radio transmitter.

14. A device for flight stabilising of an unmanned and remote controllable airborne object and for achieving at least in part an automatic restoring of the horizontal attitude of the airborne object, comprising:
an angular rate sensor for at least one of the inclination axes roll and pitch (elevator),
an integrator for a measured signal from said angular rate sensor, and
an electronic circuit suitable adapted to mix a steering signal given by the pilot as a nominal-value, next to an integral of the measured signal as an actual value of an inclination angle, or to form a difference between the nominal value and actual value,
wherein the duration of the integration time is narrowed down according to a defined time constant or a defined time window.

15. A device for flight stabilising of an unmanned and remote controllable airborne object and for achieving at least in part an automatic restoring of the horizontal attitude of the airborne object, according to claim 14 further comprising:
a signal connection with a rotation signal signalising at least approximately the yaw movements of the airborne object, and that the apparatus is adapted to subject its arithmetic values to a vectorial rotation, wherein the angle of rotation is controlled by the rotation signal.

16. A device for flight stabilising of an unmanned and remote controllable airborne object and for achieving at least in part an automatic restoring of the horizontal attitude of the airborne object, according to claim 14 wherein:

the time constant or time window is adapted so that with the aircraft held fix, after the nonrecurring giving and terminating of a steering deflection of common duration, the integral value, starting from a zero value, has a value of little influence on the control point in comparison with the portion of the steering signal in the control point.

17. A device for flight stabilising of an unmanned and remote controllable airborne object and for achieving at least in part an automatic restoring of the horizontal attitude of the airborne object, according to claim 14 wherein:

at least in one mode of operation, no further attitude measuring instruments are used.

18. A device for flight stabilising of an unmanned and remote controllable airborne object and for achieving at least in part an automatic restoring of the horizontal attitude of the airborne object, according to claim 14 wherein:

the device is structurally unified with an unmanned aircraft.

19. Method for flight stabilization of an unmanned remote controlled airborne object capable of hovering, in particular rotary wing aircraft, using an angular rate sensor for at least one of the inclination axes roll and pitch (elevator) whose measured signal is integrated with respect to time, characterized in that:

a steering signal given by the pilot, hereinafter referred to as nominal value, is admixed next to the integral of the measured signal or subject to a difference formed with the integral of the measured signal, said measured signal hereinafter referred to as actual value;

furthermore characterized in that the duration of the integration time is narrowed down accordant to a defined time constant or accordant to a defined time window, wherein the time constant or time window is longer than the time of common steering deflections.

* * * * *